United States Patent [19]

Okamura

[11] 4,323,832
[45] Apr. 6, 1982

[54] SYSTEM FOR CONTROLLING THE SPEED OF A MAGNETIC TAPE TRANSPORT MOTOR

[75] Inventor: Eiji Okamura, Kamakura, Japan

[73] Assignee: Fujitsu Limited, Kawasaki, Japan

[21] Appl. No.: 928,104

[22] Filed: Jul. 26, 1978

[30] Foreign Application Priority Data

Aug. 5, 1977 [JP] Japan .................................. 52-93771

[51] Int. Cl.³ .............................................. H02P 5/16
[52] U.S. Cl. ......................................... 318/341; 318/6;
318/314; 318/318; 364/110; 364/167; 242/75.51
[58] Field of Search .................... 318/6, 341, 314, 318, 318/369, 329; 242/75.51; 364/110, 118, 107

[56] References Cited

U.S. PATENT DOCUMENTS

| 3,836,833 | 9/1974 | Harris et al. | 318/369 |
| 3,846,760 | 11/1974 | Ironside | 364/110 |
| 3,950,682 | 4/1976 | Dohanich Jr. | 318/314 |
| 3,986,089 | 10/1976 | Sword et al. | 318/318 |
| 4,054,820 | 10/1977 | Foster | 318/341 |
| 4,079,235 | 3/1978 | Froyd et al. | 364/118 |
| 4,090,116 | 5/1978 | Lippitt | 318/329 |
| 4,133,615 | 1/1979 | Zitelli et al. | 364/110 |
| 4,146,922 | 3/1979 | Brown et al. | 364/118 |

OTHER PUBLICATIONS

Hilford, M. H. "Using Intelligent Peripherals for Boosting Microprocessor Speed", *Machine Design*, Jan. 6, 1977, pp. 70-74.

Burger et al., "A Microprocessor Driven Digital Servo System" Proceedings, I.E.C.I., Mar. 23, 1976, pp. 159-163.

*Primary Examiner*—David Smith, Jr.
*Attorney, Agent, or Firm*—Staas & Halsey

[57] ABSTRACT

Disclosed is a system for more precisely controlling the speed of a magnetic tape transport motor in an information storage apparatus of a magnetic tape type, by including a program for controlling the speed of the magnetic tape transport motor in the microprogram for controlling the information storage apparatus of a magnetic tape type.

1 Claim, 7 Drawing Figures

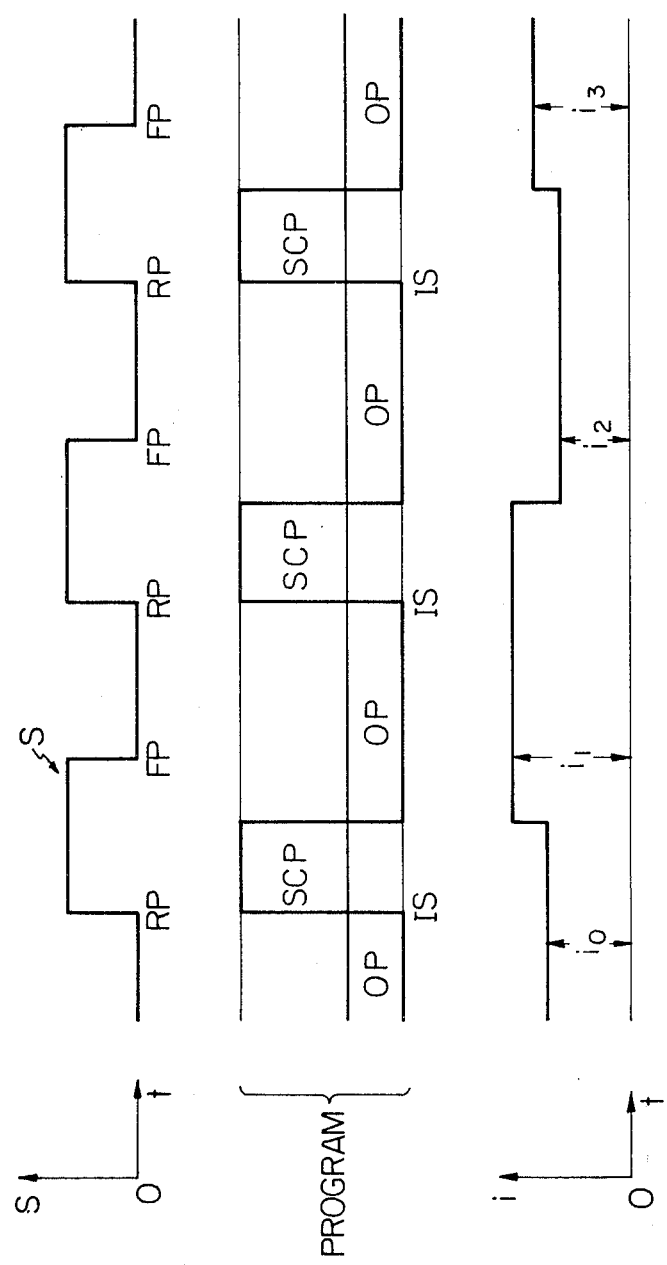

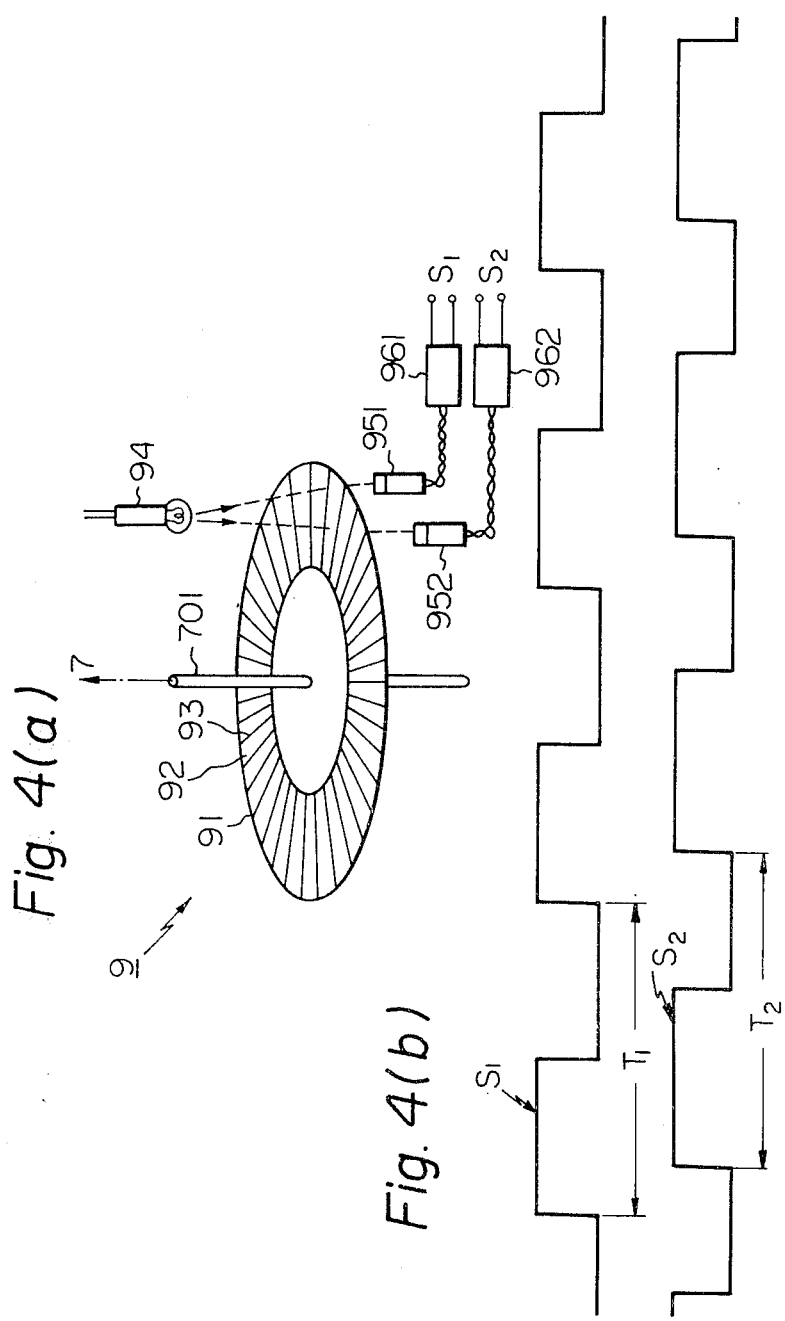

SYSTEM FOR CONTROLLING THE SPEED OF A MAGNETIC TAPE TRANSPORT MOTOR

BACKGROUND OF THE INVENTION

1. Field of the Invention

This invention relates to a system for controlling the speed of a magnetic tape transport motor and, more particularly, to a system for controlling the speed of a magnetic tape transport motor using a microprogram.

2. Description of the Prior Art

The method of controlling the speed of a magnetic tape transport motor is known in the prior art, as for example in U.S. Pat. Nos. 3,293,522, 3,383,578 and 3,764,876. In the case where a magnetic tape controlling apparatus is provided with a a microcomputer containing a microprogram memory circuit, for performing various operating functions for controlling the tape, the speed of the control of the magnetic tape transport motor is achieved by an independent device.

However, in the prior art described above the following disadvantages exist. Firstly, the size and the price of the magnetic tape controlling apparatus cannot be reduced, because an independent device for controlling the speed of the motor must be provided. Secondly, the advantages which can be obtained by using a microprogram cannot be fully realized, because the microprogram does not include a program for controlling the speed of the motor. Thirdly, it is difficult to precisely control the speed of the motor in accordance with a predetermined controlling program of the magnetic tape controlling apparatus.

SUMMARY OF THE INVENTION

It is an object of the present invention to provide an improved system for controlling the speed of a magnetic tape transport motor which is included in a magnetic tape controlling apparatus.

It is another object of the present invention to provide an improved system for controlling the speed of a magnetic tape transport motor in combination with the microprogram memory circuit of a microcomputer in a magnetic tape controlling apparatus.

It is a further object of the present invention to provide an improved system for controlling the speed of a magnetic tape transport motor which promotes the reduction of the size and the price of the device for controlling the speed of the motor, the full utilization of a microprogram, and the optimum control of the speed of the magnetic tape transport motor.

BRIEF DESCRIPTION OF THE DRAWINGS

FIG. 3 shows an example of the time chart of the operation of the system of FIG. 1;

FIGS. 4(a) and (b) show another example of a motor speed detecting device and a wave-form as an alternative to FIGS. 2(a) and (b), respectively, and;

DETAILED DESCRIPTION OF THE PREFERRED EMBODIMENTS

Figure 1:
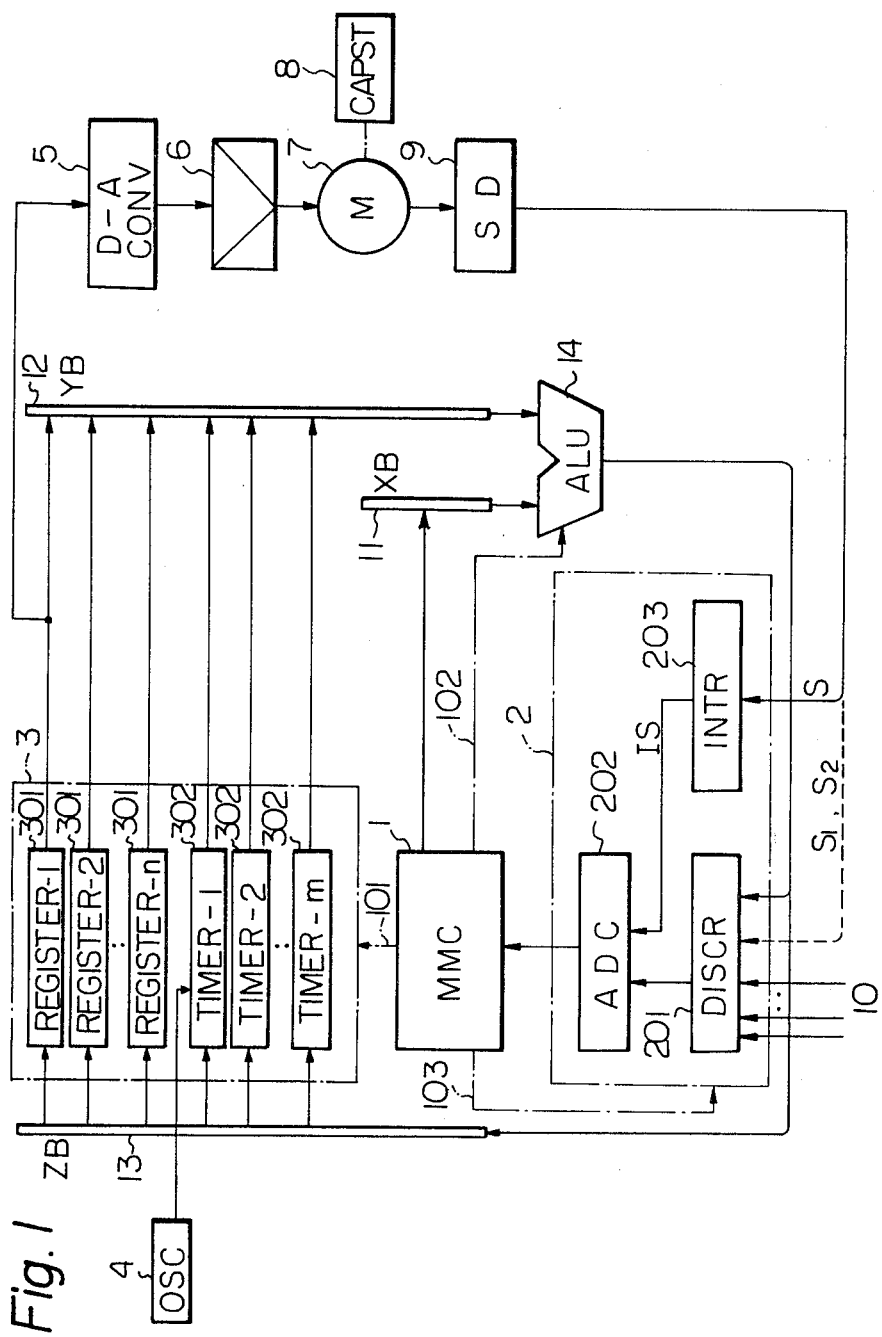
FIG. 1 shows a schematic block diagram of the system according to the present invention.

As an embodiment of the present invention, the system of FIG. 1 includes a microprogram memory circuit (MMC) 1, an address selecting circuit 2, a register file 3, a digital-to-analog converter 5, a power amplifier 6, a magnetic tape transport motor 7, a magnetic tape transport capstan 8, a speed detector 9, X-, Y- and Z-buses 11, 12 and 13, and an arithmetic logic unit 14. The address selecting circuit comprises a discriminating circuit 201, an address counter 202 and an interrupting circuit 203. The discriminating circuit 201 receives signals from the arithmetic logic unit 14, the speed detector 9, and the other job signals 10, and produces an output signal of either "1" or "0". If the output signal "1" is produced from the discriminating circuit 201, the address counter 202 effects a jump to a predetermined address to the speed control program. If the output signal "0" is produced from the discriminating circuit 201, the address counter 202 effects the addition of one unit.

The register file 3 comprises REGISTER-1, REGISTER-2, ..., REGISTER-n and TIMER-1, TIMER-2, ..., TIMER-m. An oscillator 4 is connected to the TIMER-1.

The above-described microprogram memory circuit 1, address selecting circuit 2, register file 3, X-, Y- and Z-buses 11, 12 and 13, and arithmetic logic unit 14 together comprise a microcomputer of the present invention.

The REGISTER-1 is connected to the digital-to-analog converter 5. The output of the converter 5 is supplied to the magnetic tape transport motor 7 through the power amplifier 6. The transporting of the magnetic tape is effected by the rotation of a capstan 8 driven by a direct-current motor 7. A speed detector 9 coupled to the motor 7 produces a speed detecting signal which is applied to the address selecting circuit 2.

Figure 2A:
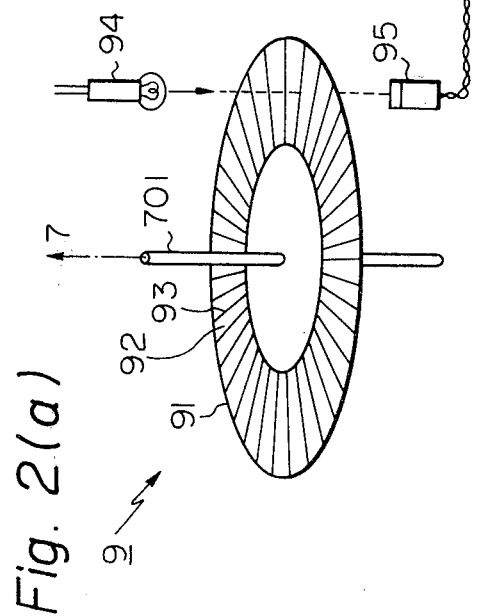
FIG. 2(a) shows an example of a motor speed detecting device included in the system of FIG. 1.
Figure 2B:
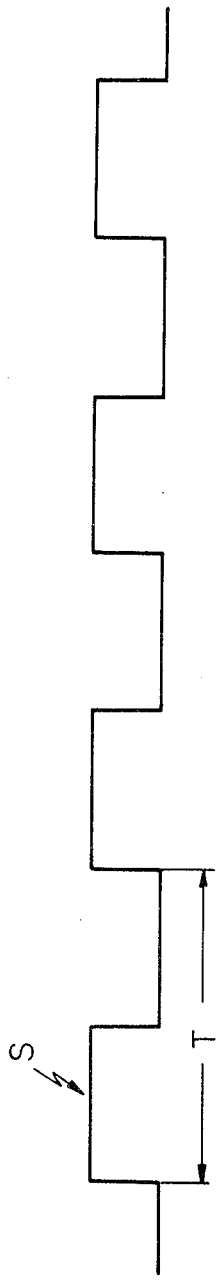
FIG. 2(b) shows the wave-form of a pulse signal corresponding to the output of the device of FIG. 2(a)

The structure of the speed detector is illustrated in FIG. 2(a). A disc 91 is coupled to the motor 7 through the axis 701. An alternating sequential arrangement of transparent zones 92 and light interrupting zones 93 is arranged on and along the circumference of the disc. A light beam emitted from a light source 94 is projected to a light sensor 95 through the transparent zones located in the circumferential portion of the disc 91. In accordance with the rotation of the disc 91 caused by the motor 7, the light beam emitted from the light source 94 reaches intermittently to the light sensor 95 due to the presence of the transparent zones 92 located alternatingly between the light interrupting zones 93. The output signal of the light sensor 95 is shaped by a wave-form shaping circuit 96 which produces a speed detecting signal S as illustrated in FIG. 2(b). The period T of the speed detecting signal S is inversely proportional to the speed of the motor. By counting the number of clock pulses which represents the length of the period T by a timer, the speed of the motor can be measured digitally.

Illustrated in FIG. 3 is an example of the time charts of the operations of the system of FIG. 1 using the speed detector of FIG. 2(a). The interrupting circuit 203 produces an interruption signal IS at the moment when the interrupting circuit 203 detects a rising point RP of the wave-form of the speed detecting signal S. The produced interruption signal IS is supplied to the address counter 202, where the signal IS causes the address counter 202 to jump to a predetermined address. Since the speed controlling program SCP is stored in the memory at the predetermined address, the operation of the speed controlling program SCP is effected. The operation of the speed controlling program SCP will be described hereinafter. The content of the TIMER-1, which represents the counted value during the last period of the speed detecting signal S, is transferred to a predetermined register, REGISTER-2, so that the TIMER-1 is cleared out and the counting of the clock pulses from the oscillator 4 can be restarted again. The counted value registered in the REGISTER-2 representing the detected speed of the motor is then transferred to the arithmetic logic unit 14 where the required motor current $i_1$ is calculated which is necessary to obtain the predetermined speed of the motor. The value $i_1$ is then registered in the REGISTER-1 via the bus 13, and then converted into an analog value by the digital-/analog converter 6. The analog value representing the required motor current is amplified by the power amplifier 6 and then supplied to the direct current motor 7 so that the speed of the motor 7 for transporting the magnetic tape is adjusted to the predetermined value.

After the finish of the speed controlling program SCP, the address counter 202 effects a new address designation so that the other program OP is started again.

As the motor continues to rotate, a falling point FP and a rising point RP alternately appear in the wave-form of the motor speed detecting signal S. At every rising point, the interrupting circuits 203 effect the interrupting operation as explained hereinbefore.

Since the counting of the TIMER-1 starts at a rising point of the wave-form of the motor speed detecting signal and finishes at the next rising point of the wave-form, the counted value of the TIMER-1 corresponds to the period of the wave-form and is thus the index of the motor speed.

Another example of the motor speed detector is illustrated in FIG. 4(a). A disc 91 having transparent zones 92 and light interrupting zones 93 is the same as the disc 91 in FIG. 2(a). The light beam emitted from a light source 94 is projected through the points in the circumferential portion of the disc 91, where the transparent zones and the light interrupting zones are formed, to both of the light sensors 951 and 952. Since these two light sensors are separated by a short distance from each other, the speed detecting signals $S_1$ and $S_2$ having a phase difference are produced at the outputs of the wave-form shaping circuits 961 and 962 as illustrated in FIG. 4(b). The motor speed detecting signals $S_1$ and $S_2$ produced by the speed detector 9 are supplied to the discriminator through the input line indicated by the broken line in FIG. 1.

Figure 5:
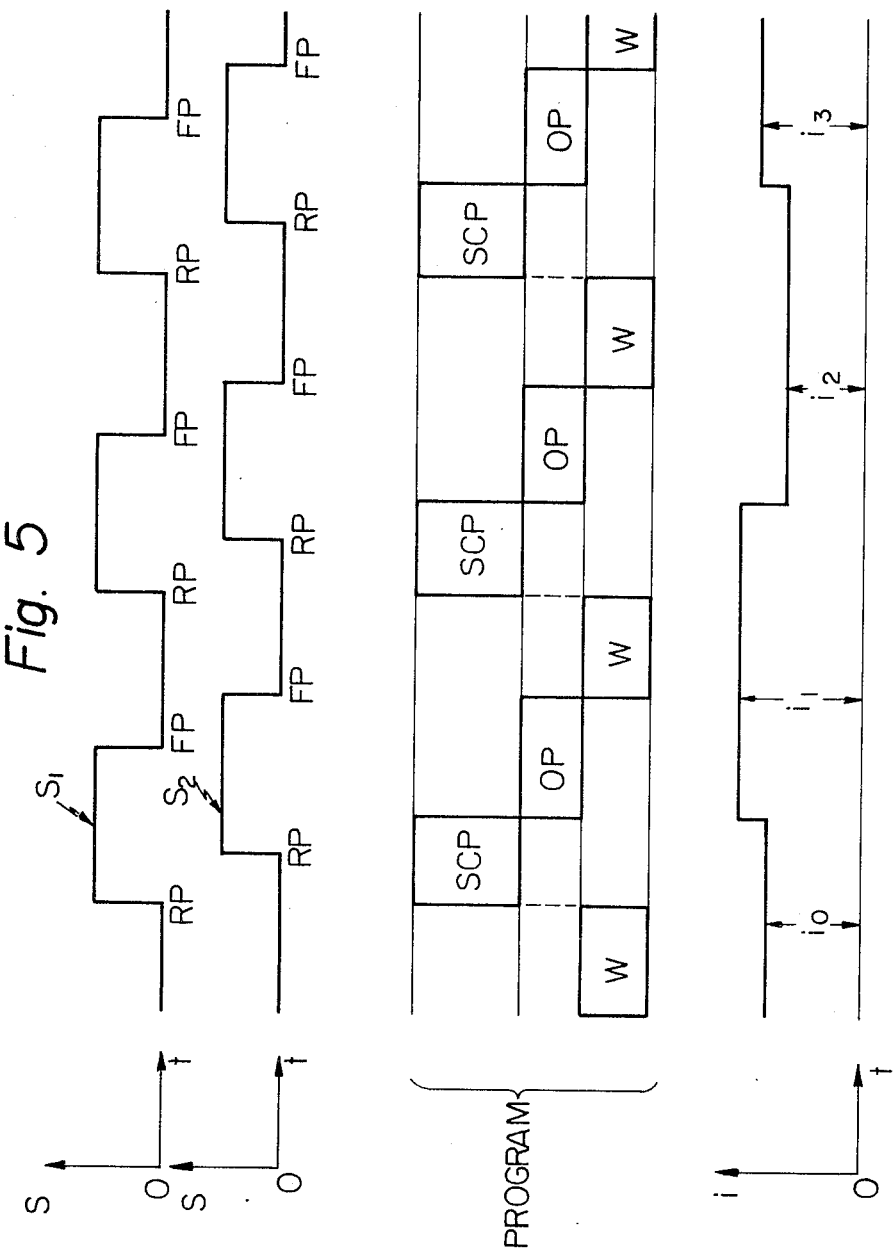
FIG. 5 shows another example of the time chart of the operation of the system of FIG. 1.

An example of the time charts of the operations of the system of FIG. 1 using the speed detector of FIG. 4(a) is illustrated in FIG. 5. The other job program OP stops at a falling point FP of the wave-form $S_2$, due to the discriminating function of the discriminator 201 having the input signal from the speed detector 9. The waiting period W lasts from the above-mentioned stopping of the other job program OP to the starting of the speed controlling program SCP at the rising point RP of the wave form $S_1$. When the next rising point RP of the wave-form $S_1$ appears, the waiting period W is terminated while the speed control program SCP is started. In this example, the speed control program is started by operating only the address selecting circuit 2 in accordance with the rising point RP of the wave-form $S_1$. In this example, the interrupting circuit used in the example which utilizes the speed detector of FIG. 2(a) is not necessary because the other last job program OP was terminated at the last falling point FP of the wave-form $S_2$.

The details of the operation of the speed control program SCP in FIG. 3 or FIG. 5 are explained in connection with FIG. 1 as follows. As is well known, a motor cannot be supplied with a current exceeding the permissible value of the current. As explained hereinbefore, the counted value of the TIMER-1 is transferred to the REGISTER-2 and then the TIMER-1 starts counting again at the rising point RP of the speed detecting signal S. The contents of the REGISTER-2 are transferred to the arithmetic logic unit 14, where the speed deviation $\Delta S$ is obtained as a result of subtraction of the reference value from the counted speed value. The speed deviation $\Delta S$ is then transferred to the REGISTER-2. Then the arithmetic logic unit 14 compares the speed deviation $\Delta S$ transferred from the REGISTER-2 with the maximum permissible speed deviation $K_1$. If the speed deviation $\Delta S$ is greater than $K_1$, a predetermined value $K_2$ is entered into the REGISTER-1 so that the speed control of the motor 7 by the value $K_2$ is effected. If the speed deviation $\Delta S$ is smaller than $K_1$, the current determining value $\epsilon K$ which is proportional to the speed deviation $\Delta S$ registered in the REGISTER-2 is entered into the REGISTER-1 so that the speed control of the motor 7 by the value $\epsilon K$ is effected.

What is claimed is:

1. A system for controlling the speed of a tape transport motor during each revolution of the motor and subsequently during each revolution for selectively controlling information transfers between said tape and an external master unit, said controlling of the speed and the termination of said selective information transfers occurring in correspondence to the rotational position of said motor, said system comprising:

a microcomputer having stored therein respective control programs for said speed control of said motor and for other control operations including said information transfers, said microcomputer outputting with each revolution of said motor a digital signal for controlling the speed of said motor during the following revolution of the motor, a digital-to-analog converter for converting each said digital output of said microcomputer to a respective analog signal for controlling the speed of said motor during the corresponding revolution of the motor, a speed detector connected to said motor, said speed detector comprising means for outputting two signals, each said signal comprising a repeated waveform with frequency proportional to the speed of said motor, and each of said two signals having a rising edge and falling edge corresponding to the respective rotational positions of said motor, said two signals differing at least in the phase of said repeated waveforms, and an oscillator providing clock pulses to said microcomputer, said microcomputer comprising:

means for counting the number of said clock pulses occurring between selected consecutive ones of said edges of a first one of said two signals, said selected consecutive edges of said first signal being separated by one period of the periodic waveforms, means for operating said speed control program in correspondence with each occurrence of said selected edge of said first signal, including means for transferring said counted number for storage in correspondence with each said selected edge of said first signal, and an arithmetic logic unit for comparing each said stored value with a corresponding value supplied by said speed control program for each said comparison, and for computing each said digital output signal for controlling the speed of said motor, means for selectively operating said other control programs as time permits between each said operation of said speed control program and each respective subsequent occurrence of a selected one of said edges of the second signal, said selected edges of said second signal also being separated by one period of the periodic waveforms, and means for stopping the operation of all said control programs in between each said selected edge of the second signal and said selected edge of the first signal, wherein, the amount of time available for said processing of said other control operations increases as the speed of said motor decreases, and said speed control is initiated, and said processing of said other control operations is terminated, at the corresponding rotational positions of said motor corresponding to the selected edge of the first of said two signals and the selected edge of the second of said two signals.

* * * * *

UNITED STATES PATENT AND TRADEMARK OFFICE
CERTIFICATE OF CORRECTION

PATENT NO. : 4,323,832

DATED : April 6, 1982

INVENTOR(S) : Okamura

It is certified that error appears in the above—identified patent and that said Letters Patent is hereby corrected as shown below:

Column 1, line 17, delete "a" (second occurrence);
  line 20, "speed of the control of the" should be --control of the speed of the--.
Column 3, line 13, "motoris" should be --motor is--.
Column 4, line 27, "the" should be --a--;
  line 66, "occuring" should be --occurring--.

Signed and Sealed this

Twenty-second Day of June 1982

[SEAL]

Attest:

GERALD J. MOSSINGHOFF

Attesting Officer       Commissioner of Patents and Trademarks